United States Patent [19]

Gibson et al.

[11] 3,902,305

[45] Sept. 2, 1975

[54] IMPACT MOWER WITH CONFORMING REEL

[75] Inventors: Duane M. Gibson, Portland; Richard S. Livermore, Oregon City; Darrel E. Teel, Portland, all of Oreg.

[73] Assignee: Omark Canada, Ltd., North Guelph, Canada

[22] Filed: Feb. 1, 1974

[21] Appl. No.: 438,543

[52] U.S. Cl. .................. 56/220; 56/245; 56/291
[51] Int. Cl.² ........................................ A01D 57/00
[58] Field of Search .......................... 56/290–292, 56/244, 245, 220–227

[56] References Cited
UNITED STATES PATENTS

| | | | |
|---|---|---|---|
| 3,400,526 | 9/1968 | Tuft | 56/220 |
| 3,545,188 | 12/1970 | Locati | 56/245 |
| 3,561,202 | 2/1971 | Tupper | 56/291 |
| 3,664,101 | 5/1972 | Hurlburt | 56/220 |

*Primary Examiner*—Russell R. Kinsey

[57] ABSTRACT

An impact mower including a guide bar, an endless flexible cutting belt entrained on the guide bar, drive means for driving the cutting belt around the guide bar, and the improvement which comprises a reel mounted above the guide bar. Said reel having end plates that support raking bars. The raking bars are curved to conform to the curved path of the cutting belt as it is driven across the leading edge of the guide bar. Bearing means supporting the raking bars on the end plates fix the orientation of the raking bars so that the curve of the raking bars are always parallel to the curve of the path of the cutting belt and so that tines carried by the raking bar always point downwardly. The reel is pivotally mounted for rotation in a plane offset from the direction of movement of the mower. The tines carried by the raking bars are thus moved angularly toward the leading edge of the guide bar to rake the material being mown into the path of the cutting belt.

2 Claims, 3 Drawing Figures

IMPACT MOWER WITH CONFORMING REEL

HISTORY

This invention relates to an impact cutting mower wherein a biasing reel is provided to rake the standing crop to be mown into the moving cutters of the mower.

Impact cutting mowers as generally contemplated herein are disclosed in prior patents as evidenced by the commonly assigned U.S. Pat. No. 3,545,188. Furthermore, biasing reels have been the subject of prior patents as evidenced by U.S. Pat. No. 3,664,101 assigned to Sperry Rand Corporation. However, it is believed that the present invention is the first to combine a biasing reel and an impact cutting mower whereby the biasing reel orients the standing crop so as to enable an impact cutting mower to cleanly cut the crop and improve the cutting efficiency thereof.

Impact mowing has been developed to the point where it is considered superior to sickle bar mowing, particularly in thick, tough crop stands. Nevertheless, in such crops where much of it is partially laying down the unassisted impact mower leaves ragged unmown portions. It is the intent of the present invention to provide a biasing reel for a mower with reel tines raking the crop into an upright position and in a direction that moves the crop toward the moving cutting blades. Whereas the leading front edge of the impact cutting mower is curved, it is an important feature of this invention that the biasing reel conforms to the curve of the cutter path whereby optimum cutting is provided throughout the length of the cutting bar.

Whereas the invention has been briefly explained by the above, a more thorough understanding will be realized by reference to the following detailed description and drawings wherein.

Figure 1:
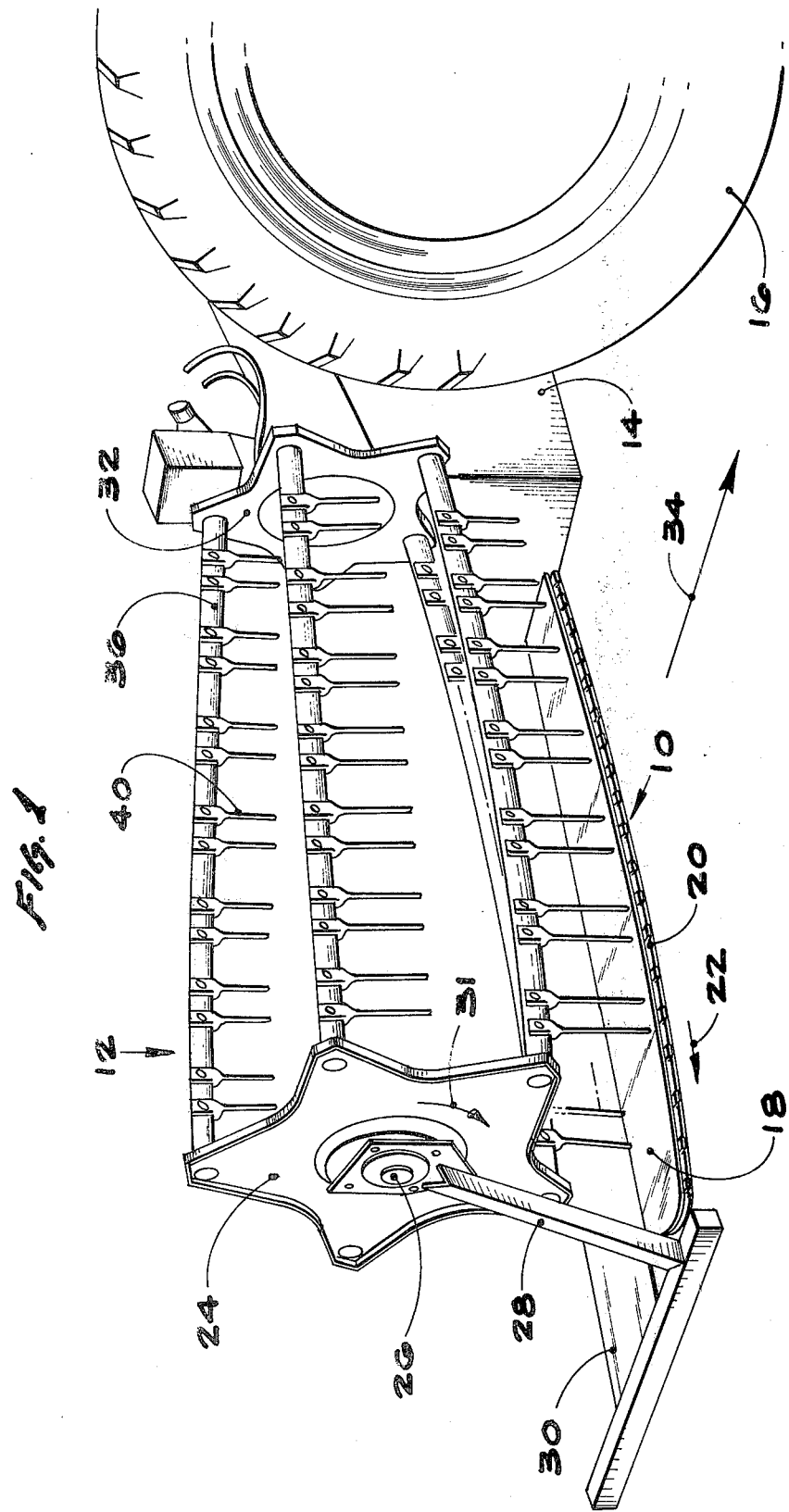
FIG. 1 is a perspective view of an impact cutting mower in accordance with the present invention.

Referring now to the drawings, an impact cutting mower 10 with a biasing reel 12 supported thereover is shown mounted by mounting assembly 14 to a tractor 16. A drive means contained in the mounting assembly 14 is conventional and thus not illustrated or described in detail. The mower 10 includes a guide bar 18 on which is entrained a cutting belt 20, all in accordance with the teachings of the aforesaid U.S. Pat. No. 3,545,188 excepting only that the direction of travel of the belt 20 has been reversed so as to travel in the direction indicated by arrow 22, the purpose of which will be explained hereafter.

The outer end of the reel 12 is mounted through a bearing assembly 26 to a support strut 28. A base 30 carries the support strut 28 and the base is carried by the tractor, e.g. through the mounting assembly 14. The inner end of the reel 12 is also mounted through a bearing assembly to the mounting assembly 14. The rotatable drive assembly connected to the reel 12 produces rotation of the reel as indicated by arrow 31.

Figure 2:
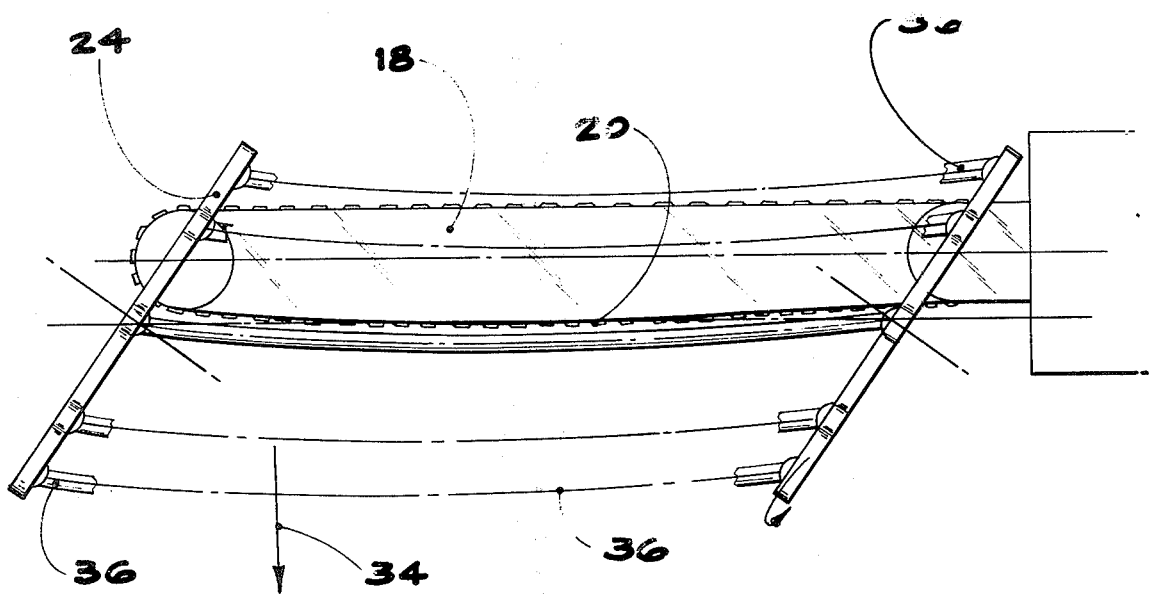
FIG. 2 is a schematic plan view of the mower of FIG. 1 illustrating the orientation of a biasing reel with respect to a guide bar and cutting belt entrained thereon.
Figure 3:
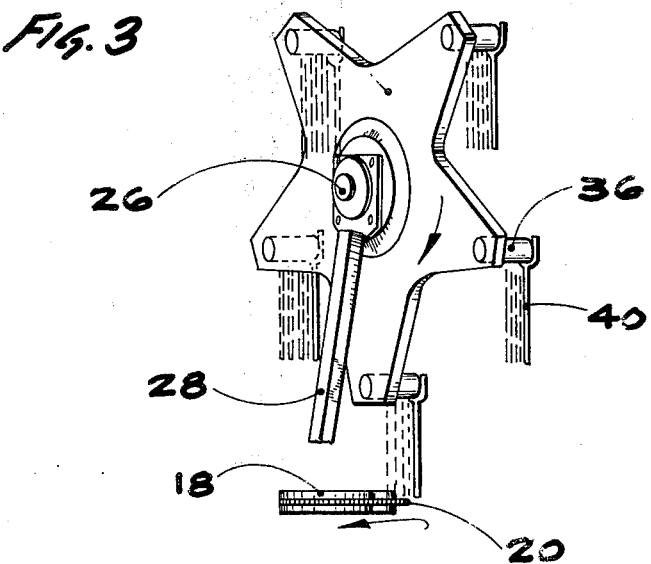
FIG. 3 is a perspective view illustrating a portion of the bearing reel of FIG. 1.

As will be most evident from FIG. 2, the leading edge of the guide bar and accordingly the path of the cutting belt 20 formed at the leading edge of the guide bar is convexly curved. The reel's cross bars 36 are supported between end plates 32. The cross bars 36 are curved to conform to the curve of the cutting belt 20. The cross bars are connected to the end plates 32 by bearings which fix the orientation of the cross bars so that the curve lies in a horizontal plane at all positions of the cross bar as it is rotated by the reel. Tines 40 are fixed to the cross bars 36 and pointed downwardly as shown in FIG. 1. The end plates 32 as shown in the drawings are angled forwardly away from the direction of travel of the tractor indicated by arrow 34. This angle is preferably about 35°. It will be realized that tines 40 carried by the cross bars 36, while retained in a downwardly extended direction during rotation of the reel functions to rake the crop in an angular direction toward the guide bar. As previously mentioned the direction at which the cutting belt is rotated on the guide bar, drives the cutting belt across the leading edge of the guide bar from the inner end toward the outer end. The mown crop that is carried by the cutting belt is thus thrown outwardly away from the drive mechanism, etc., located at the inner end of the mower. The angular direction at which the reel is rotated is directed inwardly and thus the raking motion of the tines is into or against the movement of the cutting belt. With the cross bars curved to conform to the path of the cutting belt, the tines are swept just over the cutting belt with a spacing that is constant throughout the length of the guide bar.

Whereas the cutting belt functions to cut the crop by impact, the raking produced by the tines straightens out the crop in addition to moving it toward the cutting belt with greatly improved results in those crops known to be most difficult to cut. It is believed that this use of a biasing reel has never been heretofore contemplated, especially as it applies to the curved path of an impact mowing cutting belt. With the teachings provided in the foregoing, those skilled in the art will be capable of variations and modifications considered a part of the present invention as defined in the appended claims hereto.

What is claimed is:

1. An impact cutting mower adapted to be mounted to a carrier vehicle and drawn in a predetermined direction, said mower including; a guide bar having an arcuately curved leading edge, a cutting belt, guide means on said guide bar guiding the cutting belt in a convexly curved path along the arcuately curved leading edge of said guide bar in a direction transverse with relation to said predetermined direction, and drive means for driving the belt around said guide bar and along said path as determined by said guide means, the improvement which comprises a reel supported by the vehicle over the guide bar, said reel including a pair of end plates in spaced relation along the length of the guide bar, cross bars supported between the end plates and raking elements carried by said cross bars, said cross bars being curved coincident to the curve of the arcuately curved leading edge of said guide bar to conform to the path of the cutting belt, and means for rotatively driving the reel whereby the raking elements pass over the cutting belt with a spacing therebetween that is consistent along the curved path of the cutting belt.

2. An impact cutting mower as defined in claim 1 wherein said end plates are parallel to each other and angular with respect to said predetermined direction of movement whereby the raking motion is angular to the path of the cutting belt.

* * * * *